July 7, 1970

J. JANECEK 3,519,913

AC TO DC CONVERTER CIRCUIT

Filed Dec. 2, 1966

INVENTOR
JOSEPH JANECEK.

BY

ATTYS.

United States Patent Office 3,519,913
Patented July 7, 1970

3,519,913
AC TO DC CONVERTER CIRCUIT
Joseph Janecek, Chicago, Ill., assignor to Motorola, Inc., Franklin Park, Ill., a corporation of Illinois
Filed Dec. 2, 1966, Ser. No. 598,805
Int. Cl. H02p 5/16; H02m 7/22
U.S. Cl. 318—331                          6 Claims

ABSTRACT OF THE DISCLOSURE

This invention pertains generally to an alternating current to direct current converter circuit and more particularly to a three phase alternating current to direct current motor control circuit. The invention incorporates the use of a relaxation oscillator triggered by the variable ramp of a saw-tooth wave to gate on a silicon controlled rectifier to provide from zero to 100% synchronized motor control. The direct current output voltage of the control circuit can be controlled manually or automatically.

Figures 1, 2:
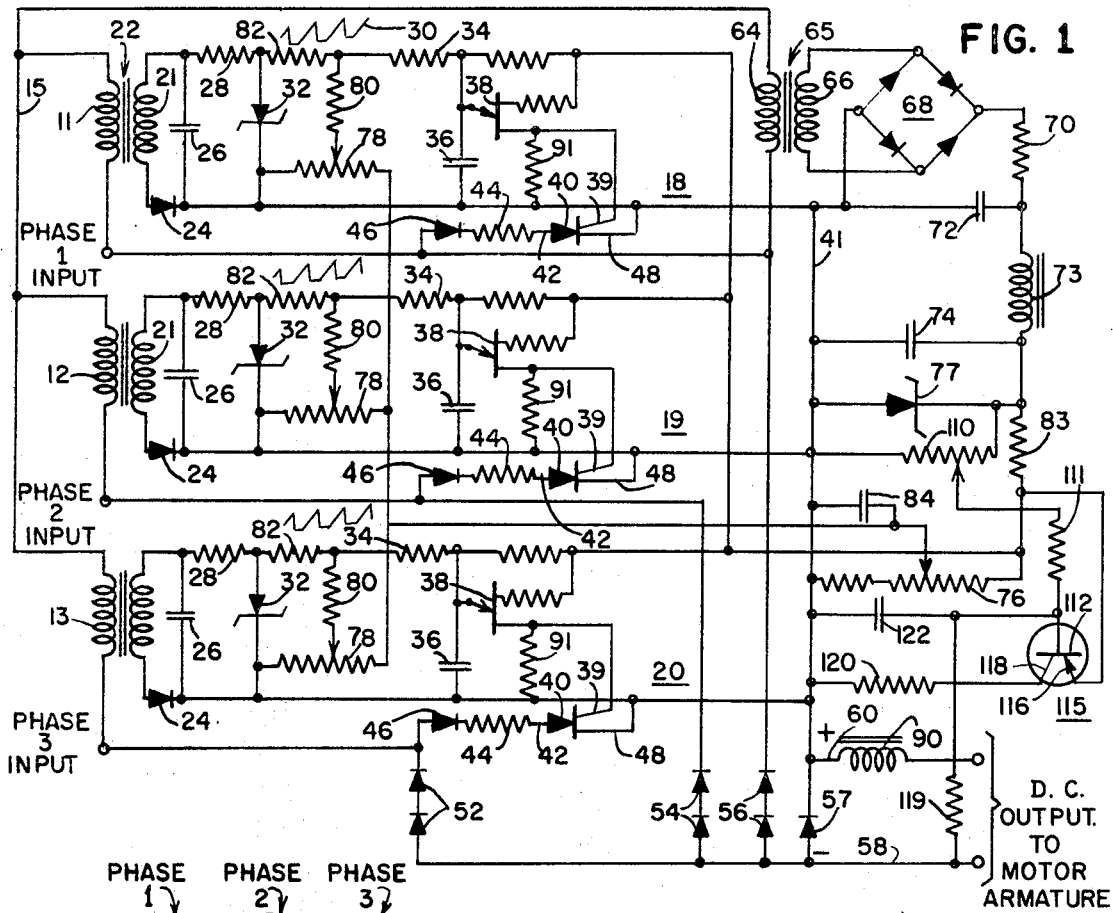

Many direct current motor circuits provide 25–100% motor control. Motor control circuits have been developed that provide 9–100% control. These have been complex and expensive circuits to produce and have required fairly sophisticated operation.

---

It is an object of this invention to provide an improved alternating current to direct current converter circuit.

It is another object of this invention to provide an improved three phase alternating current to direct current motor control circuit.

It is a further object of this invention to provide an improved three phase alternating current to direct current motor control circuit that is relatively inexpensive to manufacture and simple to operate.

A feature of this invention is a three phase alternating current to direct current converter circuit having a relaxation oscillator coupled to each phase for periodically firing an associated triggering device which couples alternating current of one polarity from the phase to an output bus, and variable resistor means coupled to the input of each oscillator adjustable to establish a predetermined time base for energizing the same.

Another feature of this invention is a three phase alternating current to direct current converter circuit having a capacitor coupled across the variable resistor means to control the rate of change of the time base upon varying the resistor means thereby controlling the time rate at which the output direct current potential changes.

A further feature of this invention is a three phase alternating current to direct current motor control circuit having an integrating circuit coupled between each of the phases and the input of each relaxation oscillator for developing a sawtooth waveform, so that adjusting the variable resistor means varies the direct current platform voltage of each sawtooth waveform to establish a predetermined time base for energizing the relaxation oscillator.

Another feature of this invention is a three phase alternating current to direct current motor control circuit having an automatic control circuit for maintaining a constant output voltage for changing loads which includes, a voltage divider network coupled to the variable resistor for establishing a predetermined potential thereacross thereby setting a desired output voltage for the control circuit. Coupled to the voltage divider network is a transistor which is responsive to variations in the output voltage to conduct to change in the voltage in the legs of the divider network. This changes the voltage on the variable resistor to cause the output voltage to change to compensate for the variations therein so that a constant output voltage at the desired potential is maintained.

In the drawing:

FIG. 1 is a schematic wiring diagram illustrating the control circuit in accordance with the principles of this invention; and FIG. 2 is a graph showing the operation of the circuit of FIG. 1.

In one embodiment of this invention, each phase of a three phase source of alternating current is coupled through a transformer to an integrating circuit. The integrating circuit generates a sawtooth waveform that is coupled to a relaxation oscillator. The ramp of the sawtooth waveform is used as a time base for energizing the oscillator. The output of each relaxation oscillator is coupled to the gate of a silicon controlled rectifier associated with that oscillator. The silicon controlled rectifier is coupled between the particular phase of the three phase source of alternating current with which it is associated and an output bus. When an oscillator is energized the associated silicon controlled rectifier is gated on to couple one phase of the alternating current source of one polarity to the output bus. Also coupled across one phase of the three phase source of alternating current is a transformer which couples the alternating current of that phase to a full wave rectifier. Coupled between the full wave rectifier and the input of each oscillator is a potentiometer. The direct current from the potentiometer establishes a platform voltage for the sawtooth waveform. By adjusting the potentiometer, the current is increased or decreased to either raise or lower the platform of each sawtooth wave, hence, the ramp of the sawtooth voltage thereby changing the time base for energizing the oscillators. By changing the time base, the angle of the alternating current voltage at which each silicon controlled rectifier conducts is changed. Therefore, by moving the platform voltage of the sawtooth ramp up and down, with the potentiometer, the amount of conduction of each silicon controlled rectifier can be controlled, hence, zero to 100% control of the direct current output voltage is available.

Referring to the drawing, FIG. 1 shows a three phase source of alternating current including coils 11, 12 and 13 connected in Y to a neutral line 15. Coupled across each of the phase windings 11, 12 and 13 are control circuits 18, 19 and 20. As the control circuit for each of the phases are identical, control circuit 18 will be described in detail, and the like components in circuits 19 and 20 will be given like numbers.

Control circuit 18 is coupled by transformer 22 which includes primary winding 11 and secondary winding 21, to phase number 1 of the three phase alternating current source. A blocking diode 24 couples the alternating current from transformer 22 to an integrating network comprised of capacitor 26 and resistors 28, 82, 80 and 78. The integrating circuit develops a sawtooth waveform as shown at 30. Coupled across the integrating circuit network is a Zener diode 32 which clips the sawtooth wave to maintain a constant peak-to-peak amplitude of the wave. Resistor 34 couples the sawtooth waveform to a relaxation oscillator which includes capacitor 36 and unijunction transistor 38. The output of the relaxation oscillator is coupled to the gate 39 of a semiconductor trigger device, silicon controlled rectifier 40. The anode 42 of the silicon controlled rectifier 40 is coupled through current limiting resistor 44 and blocking diode 46 to the input of phase 1 of the three phase alternating current source. The cathode 48 of the silicon controlled rectifier 40 is coupled to the high side of the DC output bus through line 41. The silicon controlled rectifier 40 passes positive swings of the alternating current.

Series connected diode pairs 52, 54 and 56 are coupled to each of the inputs of phases 1, 2 and 3 respectively and are of the polarity to pass the negative-going swings of the alternating current. This maintains the line 58 of the DC output bus at a negative potential with respect to the positive swings of the AC current. Diode 57 is coupled to the cathodes of the silicon controlled rectifiers 40 and absorbs any negative transients developed.

Coupled across winding 11 of phase 1 is a coil 64 which is the primary of transformer 65. The secondary 66 of the transformer 65 is coupled to a full wave rectifier 68. The direct current output of rectifier 68 is coupled by resistor 70 through a filter network consisting of capacitor 72, choke 73 and capacitor 74 to a potentiometer 76. Coupled across the potentiometer 76 for maintaining a constant DC potential is a Zener diode 77. The DC current is coupled through the potentiometer 76 and trimming potentiometer 78 of control circuit 18 to the voltage divider formed by resistors 80, 82 and 34. The DC potential that is determined by the potentiometers 76 and 78 is joined with the sawtooth wave 30 at the junction of resistors 80 and 82 to provide a platform bias voltage for that waveform. Varying the potentiometer 76 will increase or decrease the DC platform voltage to raise or lower the ramp of the sawtooth wave 30.

Coupled across the potentiometer 76 is a capacitor 84. Capacitor 84 charges through resistor 83 and resistor 76 to control the time rate at which the platform voltage raises the ramp of the sawtooth wave. Therefore, the capacitor 84 dampens any sudden changes in the potentiometer 76.

Operation of the motor control circuit may be understood by considering the graph of FIG. 2 with the schematic diagram of FIG. 1. The discussion will be directed to the relationship of phase 1 to phase 3 but it should be understood that phase 2 reacts with phase 1 and phase 3 with phase 2 in the same relationship to provide a continuous output DC voltage.

Shown coupled to the DC output bus of the motor control circuit is a saturable reactor 90. As the DC output potential varies, so does the direct current through the saturable reactor to vary the degree of saturation of the core. This limits peak current on the main output at lower voltage levels where they are most prevalent.

In FIG. 2 the line 92 indicates the trigger threshold voltage for the unijunction transistor 38. When the ramp 94 (amplitude) of the sawtooth waveform 30a exceeds the threshold voltage as indicated by line 92, the unijunction transistor 38 will conduct firing the silicon controlled rectifier 40 thereby applying alternating current through the silicon controlled rectifier 40 to the high side of DC output bus 60 by line 41. The sawtooth wave 30 by itself does not have a large enough amplitude to charge capacitor 36 in order to trigger unijunction transistor 38. By adjusting the platform voltage 95a of wave 30a through potentiometer 76, the ramp 94 of the sawtooth wave 30a rises to a point where the amplitude of the ramp is great enough to surpass the threshold voltage 92 so that when the ramp exceeds the threshold voltage at point 93 for instance, the capacitor 36 is charged to where it fires the unijunction transistor 38. When the unijunction transistor 38 fires, the capacitor 36 is discharged through resistor 91 to trigger silicon controlled rectifier 40.

For illustrative purposes it will be supposed that the potentiometer 76, which is calibrated in r.p.m., is set by the operator to a slow speed. The setting of the potentiometer 76 moves the platform bias voltage 95a of the sawtooth wave 30a so that the ramp 94 causes conduction of the unijunction transistor 38 and SCR 40 for 15° of the AC current being applied to the anode 42 of the SCR 40. At the point where ramp 94 intersects the threshold voltage 92 at 93 and with the phase 1 current being positive with respect to phase 3 conduction will take place. Conduction will continue until phase 1 becomes negative with respect to phase 3 (point 101) at which time the SCR 40 will turn off. It should be noted that the shaded area 98 indicating the period of conduction does not go completely to the point where the wave representing phase 1 intersects the wave representing phase 3. The reason for this is that the silicon controlled rectifier 40 actually turns off shortly before the phase 1 voltage swings negative with respect to phase 3. In addition the relation of the phases are such that conduction ranges between −25° and 195°. In this instance conduction started at 180° and ceased at 195° for a total of 15° conduction.

The next waveform 30b in FIG. 2 illustrates operation of the motor at medium speeds. In manual operation, the operator by moving the potentiometer 76 increases the platform voltage 95b to a point where the amplitude of ramp 100 of sawtooth wave 30b exceeds the threshold bias 92 of unijunction transistor 38. This occurs at about midpoint along the ramp 100. Once again with phase 1 being more positive than phase 3 the SCR 40 will be fired and conduction will occur. The SCR 40 will continue to conduct until phase 1 goes more negative than phase 3 at point 102. This illustrates midpoint conduction or 105° of conduction of the alternating current being applied to the anode 42 of the silicon controlled rectifier 40.

The final portion of the graph of FIG. 2 illustrates full conduction of the motor control circuit for maximum r.p.m. of the motor. In this example, the potentiometer is moved to a point such that the DC bias platform 95c elevates the ramp 104 of the sawtooth wave 30c to a point where the amplitude of the ramp 104 exceeds the threshold voltage for the unijunction transistor 38 at an early point on the ramp causing that transistor to conduct to fire silicon controlled rectifier 40. Because the phase 1 waveform is positive with respect to phase 2 at this time, the SCR 40 will conduct until phase 1 goes negative with respect to phase 3 at point 106. This full power position of the potentiometer 76 causes the SCR 40 to conduct for 220° of anode voltage, or from −25° to +195°. From these examples it can be seen that the motor control circuit of this invention provides for simple operation, for by moving the potentiometer 76 to vary the platform voltage there can be zero to 100% control of the direct current output potential of the circuit.

Furthermore, because the sawtooth wave source for firing the silicon controlled rectifier is taken from the voltage source on the anode of the silicon controlled rectifier, the sawtooth voltage is positively synchronized with the anode voltage so that the control circuit is held in synchronization.

When the control circuit is first energized, the capacitor 84 is charged through resistor 83 and potentiometer 76 as previously explained. This provides an important function by providing a time base for slowly varying the direct current output voltage. It can be seen, if, for instance, the potentiometer is set for 100% DC output, when the circuit is first energized, the capacitor will slowly charge until the set potential is across the potentiometer 76. As the capacitor charges, the platform voltage will slowly rise until the capacitor is fully charged at which point the platform voltage will be at the 100% DC output position set by potentiometer 76. The values of resistors 83, 76 and capacitor 84 will, of course, determine the time that this charging process takes place. This gradual rise in the platform voltage prevents high speed starting of the direct current motor and heavy current load on the circuit. The capacitor 84 also provides a dampening function when there is rapid changes of the potentiometer by the operator.

The trimmer potentiometers 78 in control circuits 18, 19 and 20 are used to synchronize the three silicon controlled rectifiers 40 in each of the control circuits so that moving the potentiometer 76 will move each of the platform voltages of the sawtooth wave the same amount so that all three phases are synchronized with one another.

This circuit also provides for automatic control of the direct current output. A potentiometer 110 cooperates with resistor 83 to form a voltage divider network supplying a bias voltage across resistor 111 to the base 112 of transistor 115. The divider network also determines the potential as applied to potentiometers 76. The emitter 116 of transistor 115 is coupled to the high side of the rectifier 68, and the collector 118 is coupled across current limiting resistor 120 to the low side of the rectifier 68. The base 112 of the transistor 115 is also connected to the low or negative side of the DC output bus, line 58, across resistor 119. A capacitor 122 is coupled across the base of transistor 115 and filters out any transient in circuit from the base 112, and also cooperates with resistor 119 to eliminate ripple. The capacitor determines the time it takes for the voltage to rise on base 112 of the transistor 115.

Operation of the automatic control of voltage output is as follows. Initially, potentiometer 76 establishes the maximum voltage output of the system. Therefore, if automatic control for 0 to 100 percent motor control is desired, the potentiometer 76 must be set to the maximum voltage output position. In the system "off" position potentiometer 110 is set to bias transistor 115 into conduction which decreases the voltage applied to potentiometer 76 thereby lowering the platform bias voltage below the threshold of conduction of the unijunction transistor 38 to cutoff conduction of the silicon controlled rectifier 40 so that there is no voltage output. With the system energized, the potentiometer 110 is set to provide the desired amount of bias for conduction of transistor 115. The regulated conduction of transistor 115 controls the potential across potentiometer 76 which in turn controls the DC output of the control circuit as previously described.

When the output voltage drops across the DC output bus because of an increased load, the voltage coupled to the base 112 of the transistor 115 by resistor 119 increases to cause conduction of transistor 115 to decrease. This, in turn, causes the potential across potentiometer 76 to increase to raise the platform voltage to cause an increased conduction at the anode 42 of the silicon controlled rectifier 40 thereby increasing the output voltage of the control circuit. If the output voltage increases above the voltage set by potentiometer 110, the process is reversed to reduce the output voltage.

The capacitor 122 provides the same function as capacitor 74 in that when the system is first energized, the capacitor 122 must charge up to apply a potential to base 112 of transistor 115. Therefore, the transistor upon energizing the system is in full conduction so there is no output. As the capacitor charges, a potential is applied to the base 112 to cause decreased conduction in transistor 115 causing an output from the control circuit. The value of the capacitor can be selected to determine the time required to bring the circuit up to the desired regulated output.

What has been described, therefore, is an improved three phase alternating current to direct current motor control circuit that is relatively inexpensive to manufacture and simple to operate.

What I claim is:

1. A three phase alternating current to direct current motor control circuit, including in combination, a plurality of integrating circuit means each respectively coupled to a different one of the three phases for developing a plurality of sawtooth waves, a potentiometer having the output thereof coupled to the output of each integrated circuit means, rectifier means coupled across one phase and coupled to said potentiometer for applying a direct current thereto for establishing a variable platform voltage for each sawtooth wave, a plurality of relaxation oscillators each having an output and an input, each sawtooth wave being coupled to said input of an associated oscillator and acting as a time base for periodically energizing the same, a plurality of semiconductor rectifying means each having first, second and third electrodes, each said first electrode being coupled to associated outputs of said relaxation oscillators, said second electrodes each being coupled to the input of a different phase, said semiconductor means being fired by the energizing of each said relaxation oscillator by said sawtooth waveforms to couple an alternating current of one polarity from each phase to provide a direct current output for running the motor, said motor r.p.m. varying in accordance with the setting of said potentiometer to change the platform voltage of each sawtooth wave thereby determining the time base for energizing each oscillator.

2. The three phase alternating current to direct current motor control circuit of claim 1 wherein said potentiometer in one direction lowers said platform voltage so that the amplitude of each sawtooth wave is less than the voltage required to energize each said relaxation oscillator, and varying said potentiometer in the direction opposite to said one direction raises the platform voltage so that each said sawtooth wave energizes said oscillator to provide up to 220° conduction for each phase thereby providing zero to 100% motor control.

3. The three phase alternating current to direct current motor control circuit of claim 1 wherein said relaxation oscillator is a unijunction transistor having a capacitor coupled thereto which is charged by said sawtooth wave for firing the same.

4. The three phase alternating current to direct current motor control circuit of claim 1 wherein said semiconductor means is a silicon controlled rectifier, and said first electrode is a gate electrode, said second electrode is an anode and said third electrode is a cathode.

5. The three phase alternating current to direct current motor control circuit of claim 1 further including capacitor means coupled across said potentiometer, said capacitor means being charged by the direct current being applied to said potentioneter to control the rate of change of the platform voltage with variations of said potentiometer setting.

6. The three phase alternating current to direct current motor control circuit of claim 1 further including an automatic control circuit for maintaining a constant output voltage for changing motor loads thereby maintaining a constant motor r.p.m., said control circuit including circuit means coupled to said potentiometer for establishing a predetermined potential thereacross thereby setting a desired output voltage for the control circuit, transistor means coupled to said circuit means, said transistor means being responsive to variation in the output voltage of the motor control circuit caused by changing motor loads to vary the current through said circuit means thereby changing the voltage across said potentiometer to change the output voltage of the control circuit to correct for the change in output voltage due to motor load.

References Cited

UNITED STATES PATENTS 3,182,372   5/1965   Chin _____ 318—345 XR
3,375,427   3/1968   Magner et al. _____ 321—18 XR

FOREIGN PATENTS 889,778   2/1962   Great Britain.

ORIS L. RADER, Primary Examiner

R. J. HICKEY, Assistant Examiner

U.S. Cl. X.R.

321—18; 318—345